US005483107A

United States Patent [19]
Xander

[11] Patent Number: 5,483,107
[45] Date of Patent: Jan. 9, 1996

[54] AUTOMATIC DEFENSIVE DRIVING ILLUMINATION SYSTEM

[76] Inventor: Wilmer R. Xander, 274 Panoramic Dr., Camdenton, Mo. 65020

[21] Appl. No.: 97,085

[22] Filed: Jul. 23, 1993

Related U.S. Application Data

[63] Continuation-in-part of Ser. No. 782,561, Oct. 25, 1991, abandoned.

[51] Int. Cl.$^6$ .................................................. B60Q 1/04
[52] U.S. Cl. ............................................. 307/10.8; 315/82
[58] Field of Search .................................. 307/9.1, 10.1, 307/10.6, 10.7, 10.8, 141.4; 361/170, 171, 195–202; 315/77–83, 360; 340/468; 364/424.05; 180/271

[56] References Cited

U.S. PATENT DOCUMENTS

| | | | |
|---|---|---|---|
| 3,043,963 | 7/1962 | Teiraki | 290/37 |
| 3,423,633 | 1/1969 | Kawai et al. | 315/83 |
| 3,443,557 | 5/1969 | Hebert | 123/179 |
| 3,521,076 | 7/1970 | Haron | 290/37 |
| 3,591,825 | 7/1971 | Keighley, Jr. | 315/82 |
| 3,685,606 | 8/1972 | Blow, Jr. | 180/114 |
| 3,699,514 | 10/1972 | Stevens | 315/79 X |
| 3,767,966 | 10/1973 | Bell | 315/83 |
| 3,769,519 | 10/1973 | Adamian | 307/10.8 |
| 3,774,071 | 11/1973 | Goodrich | 315/83 |
| 4,236,099 | 11/1980 | Rosenblum | 315/83 |
| 4,287,565 | 9/1981 | Haubner et al. | 364/580 |
| 4,613,791 | 9/1986 | Kurihara et al. | 315/82 |
| 4,665,321 | 5/1987 | Chang et al. | 307/10.8 |
| 4,667,129 | 5/1987 | Papillion | 315/82 |
| 4,684,819 | 8/1987 | Haag et al. | 315/82 |
| 4,965,461 | 10/1990 | McRoberts, Jr. et al. | 307/10.8 |

*Primary Examiner*—A. D. Pellinen
*Assistant Examiner*—Fritz M. Fleming
*Attorney, Agent, or Firm*—Richard J. Grundstrom

[57] ABSTRACT

The automatic defensive driving illumination system of this invention automatically illuminates headlights, taillights, side markers and other lights of a vehicle normally activated with the headlight switch. The automatic defensive driving illumination system first determines if the engine of the vehicle is running, determines when the starter for said engine is off and the ignition for said engine is on. If these conditions are present a delayed signal is generated. The delayed signal is combined with a signal from a timer which determines if the time of the day is during the hours of darkness. If the ignition switch is on, the engine is running and the time is during the hours of darkness the automatic defensive driving illumination system will automatically illuminate the headlights, taillights, side markers and other lights of a vehicle normally activated with the headlight switch after the delayed signal is generated. The automatic defensive driving illumination system of this invention can be used in conjunction with the manual light switch of the vehicle.

16 Claims, 6 Drawing Sheets

AUTOMATIC DEFENSIVE DRIVING ILLUMINATION SYSTEM

This is a continuation-in-part of application 07/782,561, filed Oct. 25, 1991, now abandoned.

BACKGROUND OF THE INVENTION

The present invention relates to an automatic defensive driving illumination system and more particularly to a system which automatically illuminates the headlights, tail lights, side markers and other external lights or other lights of a vehicle.

When driving, drivers should be alert for other drivers along with other obstacles and hazards. Particularly at dusk and during the hours of darkness it is important for the lights of the vehicle to be illuminated, for both the driver to observe obstacles and hazards and for other drivers to see the vehicle. Throughout the years wherever there are vehicles in use drivers have failed to turn on the headlights of the vehicle during the hours of darkness. This failure results in a hazard for the driver, for the occupants of the vehicle, for other vehicles and their occupants, and for pedestrians and property.

The failure to turn on the lights can be for any one of many reasons. The driver may have been driving before it got dark and forgets to turn on the lights or the driver does not notice the diminishing light condition. The driver may be under the influence of alcohol or drugs which diminishes the memory and forgets to turn on the lights or the driver intentionally leaves the lights off for a thrill. The list of reasons could be lengthy but they can all generally be contributed to human failure or the lack of requisite consciousness. The failure to turn on the lights has resulted in vehicle and property damage, automobile accidents, and even death in some instances.

Additionally, emergency vehicles, motorcycles and some other types of vehicles typically operate with the headlights and other lights illuminated at all times. The illumination of the lights enhances the visibility of the vehicle even during the daylight hours. In some states it is the law that such vehicles operate with the lights illuminated.

The problem of failing to illuminate the lights has been address in the prior art. There are several light illumination systems available which automatically turn on some lights under certain circumstances. These systems generally utilize photosensitive cells or timing mechanisms of some sort. The photosensitive cells generally monitor the ambient light conditions. When the photosensitive cells sense a lack of illumination or a decrease in the light conditions, associated circuitry activates the lights. Some of these systems also incorporate other features for added attraction and convenience for the consumer. This includes the use of a second sensor to monitor for oncoming lights. The second sensor, when activated by oncoming lights, automatically switches the lights from high beam to low beam. Another system is tied into the windshield wiper, so that any time the wipers are activated the lights are illuminated.

Other related systems automatically deactivates the lights after a predetermined time period. Generally, the systems of this design deactivates the lights after an elapsed time from the ignition switch being shut off. This is accomplished either through a timer of some sort or by some sort of delayed switching such as a temperature actuated switch.

There are also several different automatic engine starting systems which are related to the field of automatic automobile apparatuses. These systems have various circuitry for monitoring and controlling various engine functions and providing the starting sequences. The automatic engine started are generally activated by three different methods or combinations of the three. This includes a timer which automatically starts the engine during some interval set on the timer; a temperature controlled device which monitors the ambient temperature to start the engine when a predetermined temperature is reached; and by remote control which is either operated by an individual or by some other controlling device.

The prior art in the use of photocells has certain disadvantages. The photocells have to be located so that they can be properly exposed to the ambient light conditions or to the lights of on coming vehicles. Therefore, by necessity the photocells must be located somewhere on or near the outer surface of the vehicle. Photocells have been placed behind the windshield or other automobile glass, on the grill, and incorporated into decorative apparatuses mounted onto the automobile. One of the primary problems with the use of photocells is that they get dirty. As dirt settled on the surface of the photocells or the protective covering the effectiveness of the photocell diminishes. Additionally, the effectiveness of photocells diminishes with time.

The photocells are typically used to illuminate lights during anytime the intensity of light is below a certain level. This could be during any hour of the day. Clocks have also been incorporate with the use of photocells to ensure lights are illuminated during hours of darkness no matter what the intensity of light. This system is described in U.S. Pat. No. 3,591,825, Keighley. However, this system provides for illumination of the lights at any time the ignition switch is on and it is either dark or the ambient light intensity is low. There is no provisions to ensure that the engine is actually running or being driven. This could result in the lights being illuminated at times not desired.

Papillon, U.S. Pat. No. 4,667,129, uses a unique approach to monitor the voltage across the battery. When the voltage across the battery is within a predetermined range, the engine is assumed to be running and the lights are illuminated. This provides an unreliable means for determining when to illuminate the lights of a vehicle. The actual voltage could be above or below the specified range for several different reasons including equipment malfunction. This could result in the lights not being illuminated when actually needed. Other problems could also illuminate the lights when you do not want them to be illuminated. This could occur when the vehicle is being started, being jumped or at some times when the key is on, and during battery recharging.

Accordingly, it is an object of the present invention to provide a fail safe system to automatically illuminate the headlights, taillights, side markers and other lights of a vehicle normally activated with the headlight switch after ensuring the engine of the vehicle is started and actually running using a fail safe method.

Another object of the present invention is to provide an automatic defensive driving illumination system which automatically illuminates the headlights, taillights, side markers and other lights of a vehicle normally activated with the headlight switch at any time during the hours of darkness after ensuring that the engine of the vehicle is actually running.

A further object of the present invention is to provide an automatic defensive driving illumination system which automatically illuminates the headlights, taillights, side markers and other lights of a vehicle normally activated with the headlight switch as the vehicle is being driven and the hours of darkness are approached.

Still another object of the present invention is to provide an automatic defensive driving illumination system which automatically illuminates the headlights, taillights, side markers and other lights of a vehicle normally activated with the headlight switch without the use of photosensitive cells or any other unreliable devices to monitor the external ambient conditions.

Still a further object of the present invention is to provide an automatic defensive driving illumination system which automatically illuminates the headlights, taillights, side markers and other lights of a vehicle normally activated with the headlight switch which can be used in addition to and in conjunction with the normal light switch for controlling the headlights, taillights, side markers and other external lights or other lights of the vehicle.

Another object of the present invention is to provide an automatic defensive driving illumination system which can be set by the driver to automatically illuminate the headlights, taillights, side markers and other other lights of a vehicle normally activated with the headlight switch at any desired time.

Yet another object of the Automatic Defensive Driving Illumination system of this invention is to provide for the illumination of the lights of a vehicle normally activated with the headlight switch only after determining whether the ignition is on, the starter is no longer engaged, the engine is actually running, it is during the hours of darkness and after a delay of sufficient time to ensure stabilization of the engine. The determination being made by a solid state device made up of integrated digital chips and related circuitry receiving input from various vehicle functions.

The above and other objects and features of the present invention will be better understood and appreciated from the detailed description given below of the main embodiments thereof, selected for purposes of illustration and shown in the accompanying figures.

SUMMARY OF THE INVENTION

To accomplish the foregoing and other objects of this invention there is provided an automatic defensive driving illumination system and more particularly a fail safe illumination system for vehicles which automatically illuminates the headlights, tail lights, side markers and other lights on a vehicle normally activated with the headlight switch after ensuring the engine is actually started and running during hours of darkness.

The automatic defensive driving illumination system first determines if the engine of the vehicle is running, determines when the starter for the engine is off or not engaged and the ignition switch for the engine is on. If these conditions are present a delayed signal is generated. The delayed signal is combined with a signal from a timer which determines if the time of the day is during the hours of darkness. If the ignition switch is on, the engine is running and the time is during the hours of darkness the automatic defensive driving illumination system will automatically illuminate the headlights, taillights, side markers and other lights of a vehicle normally activated with the headlight switch after the delayed signal is generated via a relay.

The automatic defensive driving illumination system of this invention can be used in conjunction with the manual light switch of the vehicle. The automatic defensive driving illumination system of this invention, in the preferred embodiment, is connected in parallel with the manual light switch of the vehicle. Therefore, the lights can be manually illuminated at any time by the operator of the vehicle.

The circuit of the automatic defensive driving illumination system generally consists of seven sections or areas of operation or, in some embodiments a portion of the seven sections. These sections include; enable logic, delay logic, silicon rectifier (SCR) decoder, time hold logic, reset logic, a clock and a silicon rectifier (SCR).

The enable logic receives inputs to determine if the engine is running, the ignition switch is in an on position, and the starter is not engaged. If these conditions are present an output is generated from the enable logic section.

The delay logic after receiving the output from the enable logic generates a delayed output signal. This delay is to ensure the engine is actually started and to allow the engine and other systems to stabilize.

The clock, which is internal to the system, determines the time of the day. The clock has an external display and the set period of time at which the hours of darkness or dusk begins may be set.

The time hold logic receives input from the clock. The time hold logic generates an output signal only during the set period of time. The set period of time generally corresponding to the hours of darkness.

The SCR decoder receives the outputs from the enable logic, delay logic, and the time hold logic. The SCR decoder then generates an output when all of the inputs are received at the same instant.

The silicon rectifier (SCR), which acts mainly as a relay, is activated by the output generated by the SCR decoder to illuminate the headlights, taillights, side markers and other lights of a vehicle normally activated with the headlight switch.

DETAILED DESCRIPTION

Referring now to the figures there is shown three preferred embodiments for the automatic defensive driving illumination system 10, hereinafter it may be referred to as A.D.D.I., of this invention. Referring to the figures, the A.D.D.I can be constructed in three principle embodiments, referred to as Series I, Series II and Series III. The Series I is designed to automatically turn on the lights when the ignition switch S1 is in the run position, the engine is running and the engine is started during the hours of darkness. The Series II is designed the same as Series I but has the added feature of activating the lights while driving when dusk or the hours of darkness begins. The Automatic Defensive Driving Illumination Series II will turn on the lights automatically and return to the Series I mode. The Series III is deigned for Emergency, Public Service and other vehicles to always automatically turn on the lights after the engine is started. The automatic defensive driving illumination system 10 of this invention is designed to illuminate headlights, talllights, side markers and other lights normally activated with the vehicle's headlight switch. These lights are generally referred to as 32 on FIG. 1, 2, and 5.

The preferred embodiments and the best mode contemplated of the automatic defensive driving illumination system 10 of the present invention are herein described. However, it should be understood that the best mode for carrying out the invention hereinafter described is offered by way of illustration and not by the way of limitation. It is intended that the scope of the invention include all modifications which incorporate its principal design features.

As indicated above the circuit of the automatic defensive driving illumination system 10 generally consists of seven sections or areas of operation or, in some embodiments a portion of the seven sections. These sections include; enable logic 14, delay logic 16, silicon controlled rectifier (SCR) decoder 18, time hold logic 20, reset logic 22, a clock 24 and a silicon controlled rectifier (SCR) 26. How these section function and interrelate for understanding purposes will be described in a circuit interpretation. These sections are typically made of NAND gates incorporated within integrated circuits chips and related resistors and capacitors to act as filters and timing sequences. The reference CH on the interior of the NAND gates in FIGS. 1, 3 and 5 indicate the chip number in which it is located and the outer numbers correspond to the external connection or pin of the chip.

Figure 6:
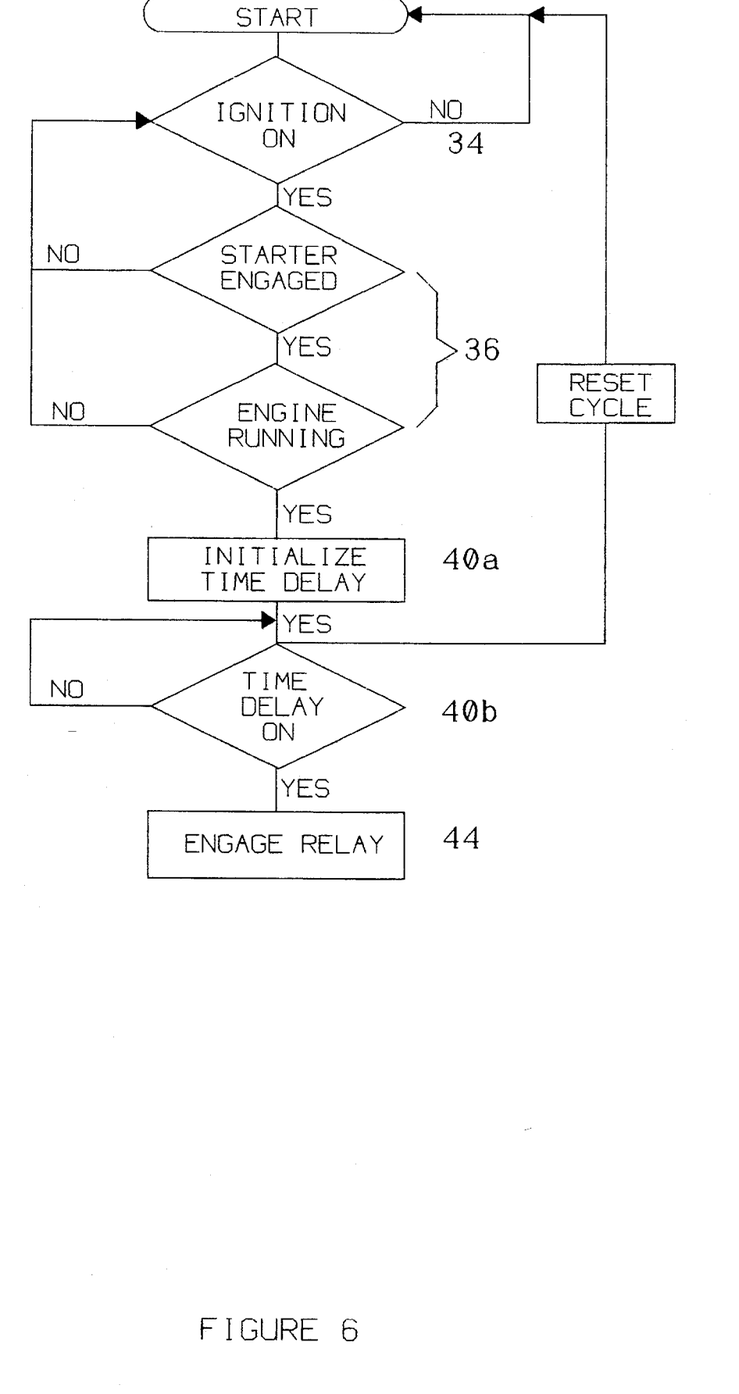
FIG. 6 is a basic flow chart of the operation of the third embodiment of the Automatic Defensive Driving illumination system.

This circuit interpretation, herein described, for the automatic defensive driving illumination system 10 is generally for Series I or the first preferred embodiment. If the Series I circuitry is understood the understanding and interpretation of Series II and III will be readily understood. The differences between the Series I, Series II and Series III will be indicated. The basic logic of the three series are illustrated on flow charts shown in FIGS. 2, 4 and 6.

Figure 1:
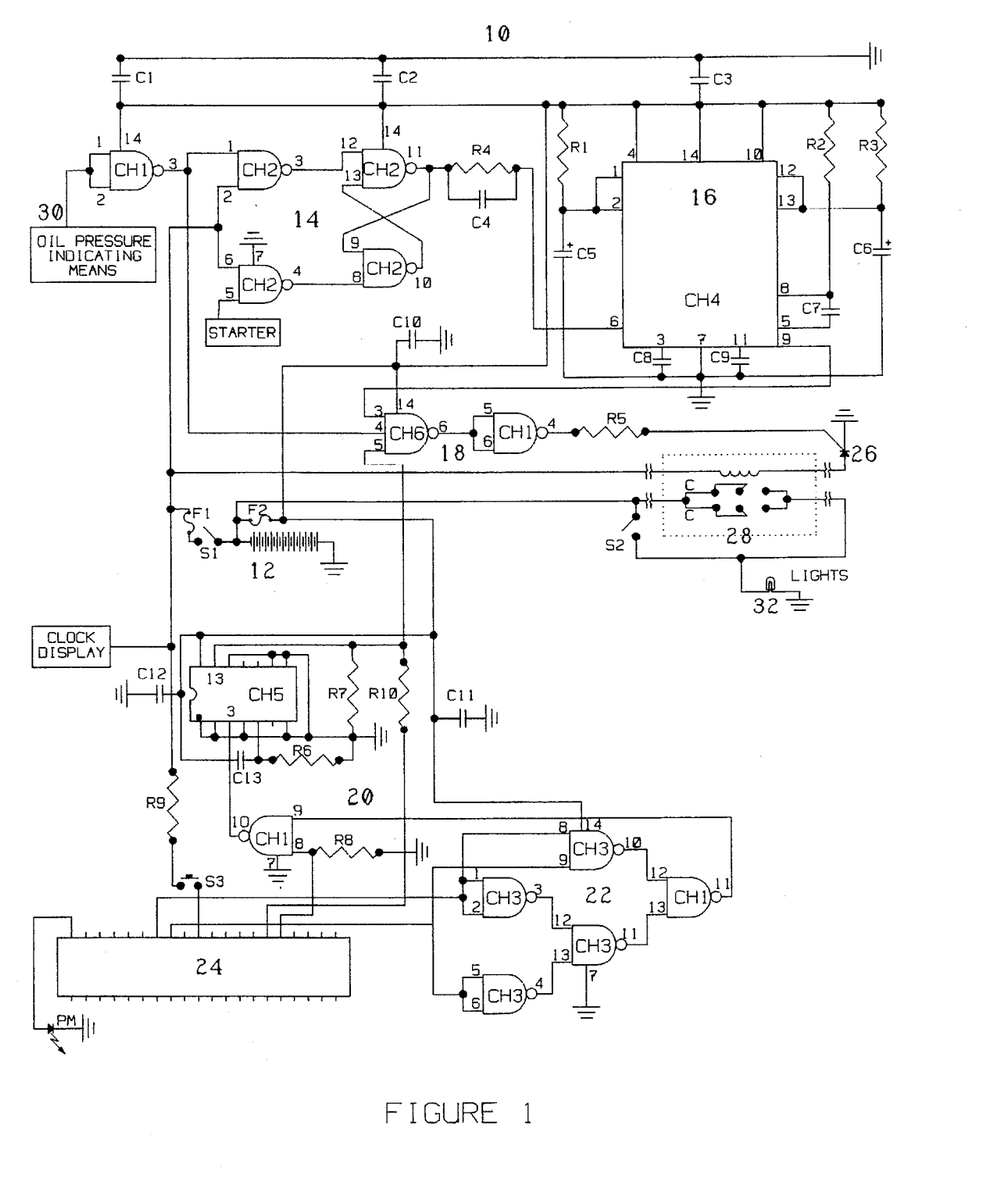
FIG. 1 is a schematic drawing of a first preferred embodiment of the Automatic Defensive Driving Illumination system.
Figure 2:
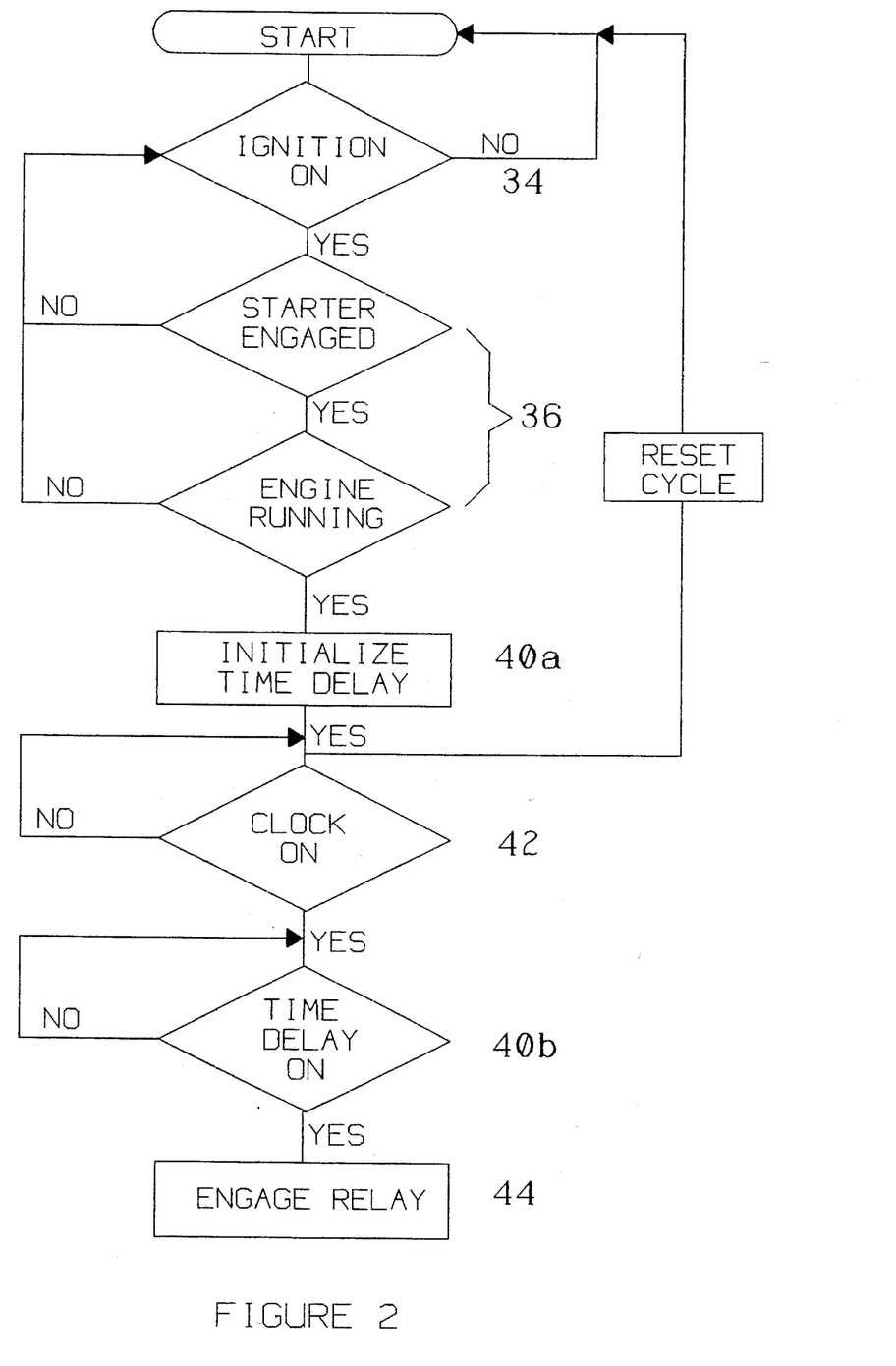
FIG. 2 is a basic flow chart of the operation for the first embodiment of the Automatic Defensive Driving illumination system.

Referring now to FIG. 1, the circuit board of the automatic defensive driving illumination 10 receives power or Vcc and ground or Vdd from the vehicle's 12 volt battery 12. All external power connection to the circuit board is fused with two 1 ampere fast blow fuses F1 and F2. One fuse F2 provides continuous power to the circuit board, the clock 24 and other components as indicated on FIGS. 1, 3 and 5. The other fuse F1 connected from the ignition switch S1 provides power and logical high to the SCR 26, clock display, dusk set S3, and the enable gate of the enable logic section 14. For understanding the terms used to explain operations, keep in mind that logic is used as a form of a yes or no. A yes corresponds to a high and a no corresponds to a low. High or low is used as indication of voltage or no voltage at a given point within the circuit. The digital integrated circuit chips used in the preferred embodiments of this invention are two state devices. These states are either low or high. Low corresponds to 0 volts or ground and high corresponds to the voltage of the source, the vehicle's 12 volt battery 12 in this case.

Power is provided from the vehicle battery 12 at all times to the circuit board and clock 24, while the clock display, dusk set S3, SCR 26, plus gated logic of the enable logic section 14 are controlled from the ignition switch S1. As the ignition switch S1 of the vehicle is turned on, a positive or high is sent to: the SCR 26, the clock display, the dusk set S3, and the control gate of the enable logic section 14, as well as the ignition coil, and the oil pressure lamp or oil sensor contacts. These were all at a previous negative or low. See FIGS. 1, 3 and 5. Ignition on logic is shown as step 34 on FIGS. 2, 4 and 6.

The enable logic section 14 of this invention receives input from the engine of the vehicle for a fail safe means of determining when to illuminate the lights of the vehicle. In the preferred embodiment, to determine if the engine is actually running the oil pressure determining means of the engine is monitored by the enable logic section 14 via pins 1 and 2 of chip CH1. The lights will only be illuminated when there is positive oil pressure. The solenoid for the engine starter is also monitored by the enable logic section 14 via pin 5 of chip CH2 to ensure the lights are not illuminated during starting operations.

Figure 3:
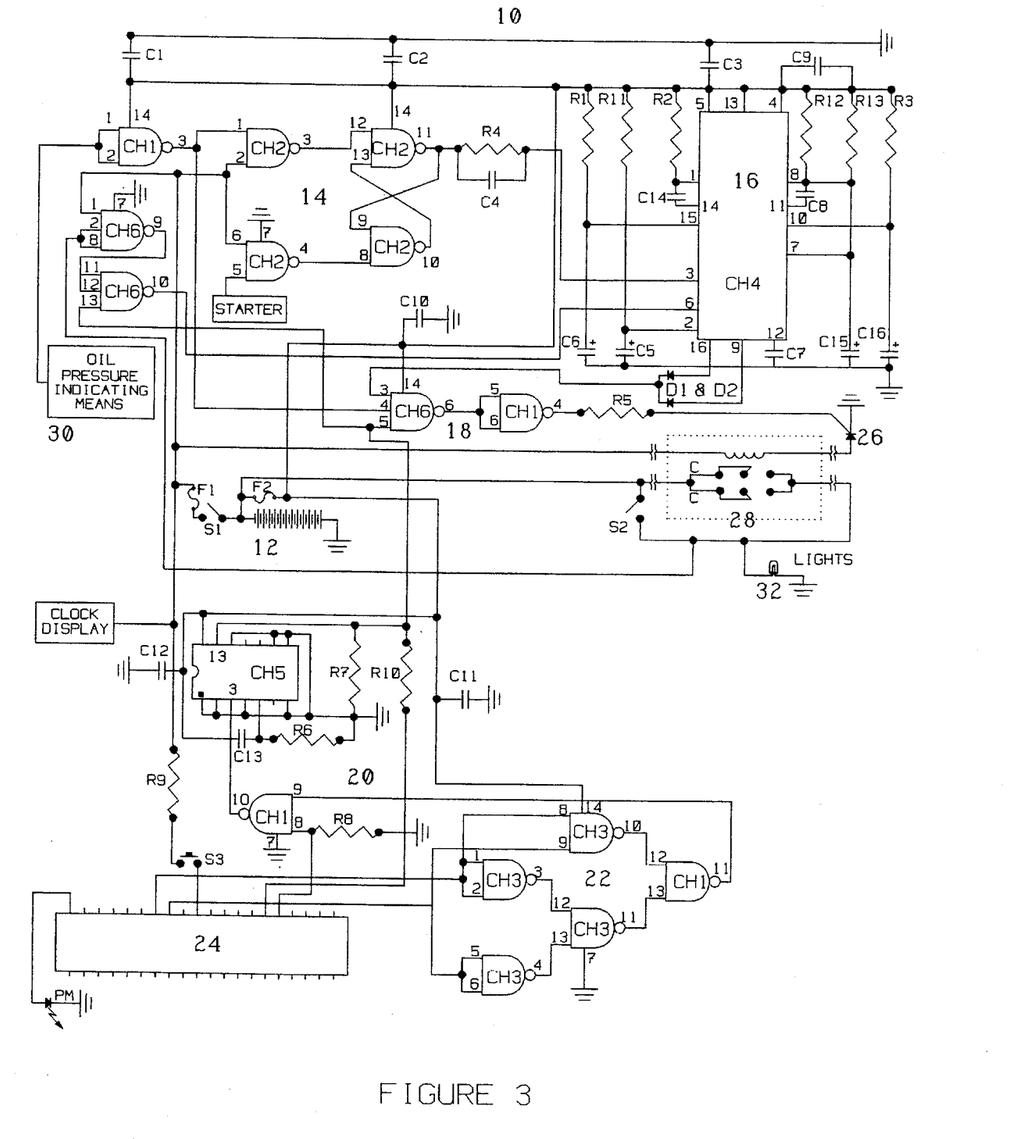
FIG. 3 is a schematic drawing of a second preferred embodiment of the Automatic Defensive Driving illumination system.

As the ignition switch S1 is turned further to the start position, a positive or high is sent to the starter solenoid which had been at a low or negative value. This results in bringing a high to pin 5 of chip CH2 while pins 1 and 2 of chip CH1 are also high indicating low oil pressure. When pins 1 and 2 of chip CH1 and pin 5 of chip CH2 become high in the enable logic section, output on pins 11 and 10 exchange logic values and a logic low is sent to the delay logic sections 16 trigger pin 6 on chip CH4. See FIG. 1. This flip-flop action is reset upon the value of low logic from the starter and oil pressure. On FIG. 5, the input trigger pin 6 of CH4 begins a two stage timing cycle ending with a total count of 28 seconds, 25 seconds first stage and 3 seconds second stage within the delay logic section 16. Upon completion this logic high 3 second pulse that is connected to pin 3 on CH6 is combined with a logic high found on pin 9 on CH6 indicating correct oil pressure to pins 4 and 5 of chip CH6. The resulting output logic on pin 6 is then connected to pins 11, 12 and 13 of CH6 and inverted to a logic high at pin 10 chip CH6. The resulting 3 second logic high is then directed to the gate of SCR 26. On FIGS. 1 and 3, correct oil pressure logic is indicated as pin 3 on CH1 and is connected to pin 4 CH6 resulting in the same logic control as shown on FIG. 5. Output of the delay logic 16 on FIG. 3 shows a timing output logic high at either pin 9 or 16 which is then directed to pin 3 on chip CH6, depending on logic coming from either pin 10 CH6 or pin 11 CH2 and is inputted to pins 3 or 6 of chip CH4 since CH4 of delay logic 16, FIG. 3, is a four stage timer. The resulting logic high from pin 4 CH1 is then directed to the gate of SCR 26. The enable logic to determine if the engine is running and whether the starter is engaged is shown as step 36 on FIGS. 2, 4 and 6.

The sensing of the oil pressure as a means of determining if the engine is running is the preferred embodiment. However, other means could also be used without departing from the inventive concepts of this invention. In another embodiment, the enable logic section 14 utilizes input from current generated from the alternator or generator of the vehicle rather than from the oil sensing unit. In this embodiment, the current or high is feed through an invertor to pin 1 and 2 of chip CH1 in place of the input from the oil pressure sensing means. The engine running determing means is generally shown on FIGS. 1, 3 and 5 and represents the oil pressure indicating means 30 on the engine.

Figure 4:
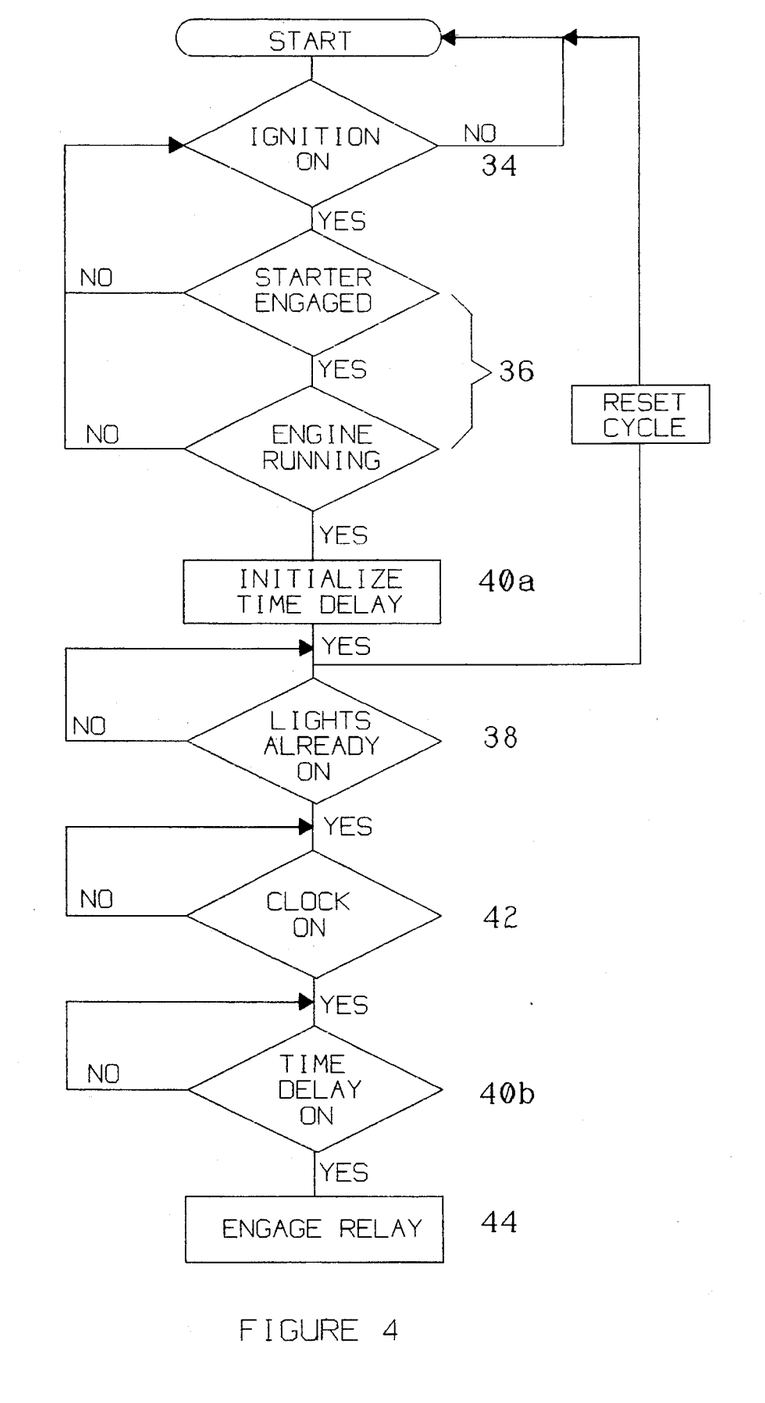
FIG. 4 is a basic flow chart of the operation for the second embodiment of the Automatic Defensive Driving illumination system.

In another embodiment, Series II, FIG. 3A and step 38 on FIG. 4 the enable logic section 14 also utilizes input from logic means of either a high or low, to determine whether the lights are already illuminated or not, which is determined on pins 1, 2, 8, 11, and 12 of chip CH 6, which then in turn will produce a combined output of a logic low on pin 10 of chip CH 6 which is connected to pin 6 of chip CH 4. This logic state is determined on pins 2 and 8 of chip CH 6 from a connection point just beyond S2 and is connected in series with that point of reference, and also pin 13 which is connected to pin 5 of chip CH 6.

The delay logic section 16 utilizes a 28 second delay before providing an output via pin 9 of chip CH4 to the SCR Decoder 18 for the illumination of the lights. This provision is to insure the engine is actually running. Using this delay also prevents the lights from coming on when the engine dies shortly after starting and also allows the engine and all other systems to stabilize before the lights are illuminated. The time delay of 28 seconds can be altered or changed by changing the values of R1, R2, R3, C6, C7, C8, and C9 on FIG. 1, and including C14, C15, C16, R11, R12 and R13 shown on FIG. 3, as appropriate. This timing can be altered, changed or modified without departing from the inventive concepts of this invention. Time delay is shown as step 40 in FIGS. 2, 4 and 6, Step 40a shows the delay being initialized and step 40b shows the delay as "on."

The third logic value to the SCR decoder 18 comes from pin 13 of chip CH5 of the time hold logic section 20. When input pin 3 of chip CH5 exchanges a value of high to low the time hold logic section 20 chip CH5 begins a output value of high and is held for a set period of time (10.5 hours in the preferred embodiment) to pin 5 of chip CH6 the third logic input value of the SCR decoder 18. Input to pin 3 of chip CH5 comes from pin 10 of chip CH1 which is the combined resulting inputs from the clock 24 and reset logic sections 22 found on pins 8 and 9 of chip CH1. Upon any setting of time on the clock 24, the output of the clock 24 is blocked by the reset logic 22 to prevent false input to pin 3 of the time hold logic section 20. The clock's 24 output is reset when pin 13 of chip CH5 becomes high thus preventing the output of the clock 24 becoming high. The clock logic "on" is shown as step 42 on FIGS. 2, and 4.

The set time period of 10.5 hours is used in the preferred embodiment but this time period could be altered as desired by the manufacture. This time can be adjusted by changing the values of C13, R6 and R7 as appropriate. The 10.5 hours has been found to cover the majority of driving times during the hours of darkness when lights should be illuminated.

The total of three input pins 3, 4, and 5 of chip CH6 must be at a high value at the same instant to result in the output pin 6 of chip CH6 to become a logic value of low, otherwise pin 6 will remain at a logic high. When pin 6 does become low the resulting low is then inverted through pins 5 and 6 of chip CH1 and output is found on pin 4 of chip CH1 at a logic high, which is then directed through a 1.2 k resistor R5 and connected to the gate of the SCR 26. The SCR 26 will turn on only if the anode is found high from the ignition switch and the gate becomes a logic high. Step 44 shown on FIGS. 2, 4 and 6.

The SCR 26 conducts power to ground connected in series from the relay coil 28 from which a logic high is given from the ignition switch S1. The SCR 26 gate will remain high from a period of three (3) seconds resulting from the output of pin 9 of chip CH4 and then return to a logic low as section 16 resets. Once the SCR 26 output is high, the contacts of the relay 28 (generally found on firewall inside vehicle in the preferred embodiment), becomes energized and power is applied to the lights. Once power is removed from the relay 28 coil and anode of the SCR 26 coming from the ignition switch S1, the relay 28 contacts return to the open position and removes power to the lights.

Operation as listed above is generally for the automatic defensive driving illumination Series I. The automatic defensive driving illumination Series II contain the same operating components as found in the Series I, but with this exception. An added feature of automation in turning on the lights when required while the vehicle is in operation. This action comes again from logic values found within the circuit at any given time. When the output of the time hold logic 20 section pin 13 of chip CH5, and the enable gate of the enable logic section 14 pin 3 of chip CH1 are both found to be at a logic high, a logic value of high or low is determined from the contacts of the relay 28 which is sent to pins 2 and 8 of chip CH6 and combined with the enable gate input to pin 1 of chip CH6. The resulting value will be found as a high output if the lights are not on, otherwise the output will be a low. This resulting output found on pin 9 of chip CH6 is then directed to pins 11 and 12 of chip CH6 and the output is combined from the final input pin 13 of chip CH6. When the output of pin 13 on chip CH5 the time hold logic section 20 becomes high it is shown also as a high on input pin 13 of chip CH6, the resulting output of pin 10 of chip CH6 will become low which is connected to a trigger input on the delay logic section 16, pin 6 of chip CH4. This action will allow the lights to be turned on if the vehicle is operating then the resulting logic of the lights being on will reset the output of gate pin 10 on chip CH6 to a logic output high. The only other difference between the Series I and the Series II is chip CH4 which is a 558 Quad Timer chip in the preferred embodiment in place of a 556 Dual Timer chip in the series I and the added convenience of automatic action of the lights coming on while vehicle is in operation and dusk begins.

The Series III is designed for use in Emergency vehicles, Public Service vehicles and other type vehicles which normally have the lights on during vehicle operation. Since the lights will be turned on every time the engine is started after a 28 second delay, the Series III does not require the clock 24, reset logic 22 and time hold logic 20. Pin 5 of the SCR decoder 18, which in Series I and II is connected to the time hold logic 20, is connected by a jumper to pin 4 of the SCR decoder 18. Therefore, pins 4 and 5 will receive the same high or low signal from the enable logic 14, which indicates whether the engine is running by oil pressure in the preferred embodiment.

The manual light switch S2 can be operated at any time using the panel switch with the installation of the automatic defensive driving illumination system 10 Series I, Series II or Series III. The automatic defensive driving illumination system 10 can be used in addition to the manual light switch S2 or can be used in conjunction with the manual light switch S2. Once the lights are turned on by the automatic defensive driving illumination system 10 the lights can only be turned off by turning off the ignition switch or removing power from the automatic defensive driving illumination system 10. Therefore, in another embodiment (not shown) provisions may be incorporated to turn off the lights when lights are not desired for some reason.

The automatic defensive driving illumination system 10 of this invention can be added to existing vehicles with little or no modifications to the existing equipment or can be incorporated at the factory.

The automatic defensive driving illumination system 10 operates in the following manner. The complete unit is under power and fused protected from the vehicle battery 12 at all times, plus all other line connection points to the unit are fused as well in order to protect the unit from any overload being sent to the unit. Once the key is turned in the ignition switch S1 the following operations go into action. Step 34 FIGS. 2, 4 and 6.

(1.) As the vehicles oil pressure indicator light comes on or the oil sensor unit indicates low oil pressure due to the engine not running plus the starter being not engaged or off, the first level of logic is obtained from these two connection points. Step 36 FIGS. 2, 4 and 6.

(2.) Once the engine has begun running and the oil pressure indicator lamp has gone out or oil pressure is high, the second level of logic comes into action, and a logic pulse is sent to both the delay logic 16 and the SCR decoder 18 sections. As the delay logic section 16 begins counting down twenty eight (28) seconds from engine start, the enable logic 14 section of the unit senses if the engine is indeed running from logic sense in oil pressure. If all is correct and twenty eight seconds have elapsed the delay logic section 16 will send out a logic high pulse to the SCR decoder 18 as a second of three logic levels, if the engine has stopped running during this period the SCR decoder 18 logic sense will be blocked and the unit is then reset ready for another engine start sequence. Step 40 FIGS. 2, 4 and 6.

(3.) The third and final logic sense of the SCR decoder 18 section comes from the time hold logic section 20 where the third logic level to the SCR decoder 18 has been designed and programmed to sense a period of time during which the lights should be turned on while driving. This program in the preferred embodiment is set for ten and one half hours (10.5) but can be extended to a maximum of thirteen and one half hours (13.5) or a minimum of one half (0.5) hour. This time period must be determined and hard-wired during circuit construction. (The standard panel light switch can be used manually at anytime). Step 42 FIGS. 2 and 4.

With the incorporation of a simple digital clock 24 designed for vehicles and modifications made to the clock 24 as indicated, the automatic defensive driving illumination system 10 enables the vehicle operator to manually set the hour and minute at which time dusk or the hours of darkness begins. During the time setting of the clock 24 in any stage of operation the output of the clock 24 is blocked by a fast/slow lockout section of the clock 24, thereby preventing any false input trigger to the time hold logic section 20. The automatic defensive driving illumination system 10 is designed with 0.1 uF capacitors (C1, C2, C3, C10, C11 and C12) as shown on FIGS. 1, 3 and 5, as voltage Vcc pin spike filters to all chips to prevent false or erratic operations. The entire main and secondary time periods of the clock 24 could be redesigned with an internal memory as to the current date, daylight savings or standard time, the corresponding periods of darkness and combined with the other sections to facilitate a smaller automatic defensive driving system commercial unit.

Figure 5:
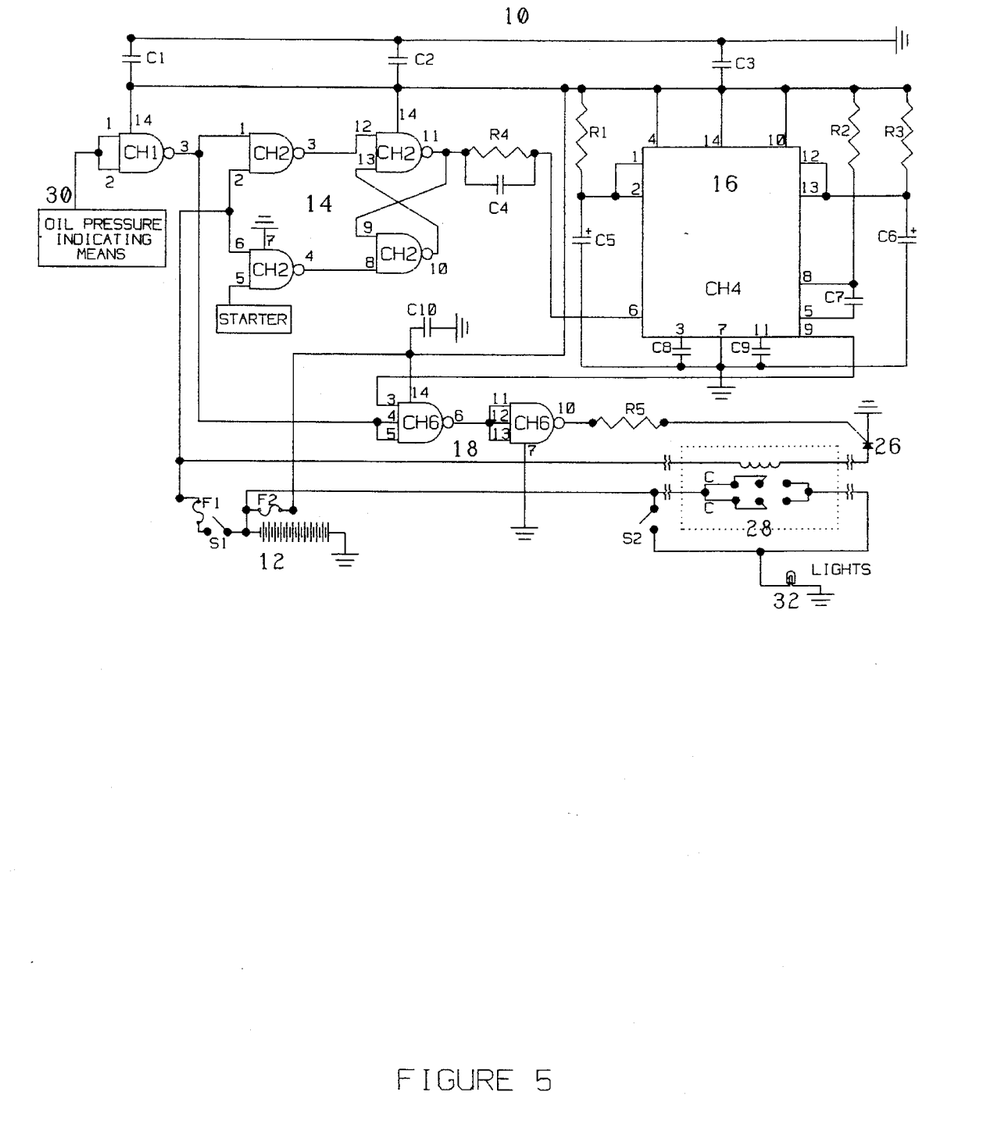
FIG. 5 is a schematic drawing of a third preferred embodiment of the Automatic Defensive Driving Illumination system.

The components for the preferred embodiments of the automatic defensive driving illumination system 10, for series I, series II and Series III include the following components;

Referenced on FIGS. 1, 3, and 5.

CH 1, 2, and 3 - 4011 Quad NAND Gate Integrated Circuit Chip
CH 4 - 556 Dual Timer Integrated Circuit Chip (Series I and III, Delay Time Chip FIG. 1 and 5)
CH 4 - 558 Quad Timer Integrated Circuit Chip (Series II, Delay Time Chip FIG. 3)
CH 5 - LS7210 Programmable Timer Integrated Circuit Chip
CH 6 - 4023 Three Input NAND Gate Integrated Circuit Chip (SCR Decoder)
24 Clock - MICRONTA L.E.D. Quartz Digital Mini Car Clock (Digital Alarm Clock Chip for LED display - ECG2060 or Equivalent)
26 SCR - Silicon Controlled Rectifier Rated 200 volt 6 Amp
28 Relay - 12 Volt DPDT 10 Amp Relay /w Socket
D1 and D2 - 60 volt PVI Diodes

| | |
|---|---|
| F1 and F2 - 1 Amp Fuses | C1 - .1 uf |
| S1 - Ignition switch of vehicle | C2 - .1 uf |
| S2 - Headlight switch of vehicle | C3 - .1 uf |
| S3 - Dusk Set switch for clock | C4 - .005 uf |
| R1 - 220 k (all resistors ½ watt) | C5 - 100 uf Electrolytic |
| R2 - 22 k | C6 - 10 uf Electrolytic |
| R3 - 220 k | C7 - .05 uf |
| R4 - 1 meg. | C8 - .05 uf |
| R5 - 1.2 k | C9 - .05 uf |
| R6 - 194 k | C10 - .1 uf |
| R7 - 47 k | C11 - .1 uf |
| RS - 55 k | C12 - .1 uf |
| R9 - 4.7 k | C13 - .10 uf |
| R10- 4.7 k | C14 - .05 uf |
| R11- 220 k | C15 - 100 uf Electrolytic |
| R12- 22 k | C16 - 10 uf Electrolytic |
| R13- 220 k | |

All of the chips and related circuitry are located on a circuit board which is not specifically referenced on the Figures.

Sample operating instructions accompanying the Automatic Defensive Driving Illumination system 10 are perceived to include the following information:

Series I

The following steps are taken to begin operation and to adjust the Automatic Defensive Driving Illumination system 10. 1. Set the hour and minute that dusk begins using the dusk set switch S3. 2. Set the current hour and minute and whether AM or PM. 3. Start the engine. If the light go on it should be dusk or sometime during the hours of darkness. 4. Turn the key off, the lights will go off, if they were on. 5. Your Automatic Defensive Driving Illumination unit should now be activated. 6. If the battery is or goes dead, repeat steps 1 through 5 to reset. Note that once the engine is started during the hours of light, the lights will not automatically come on when entering the hours of darkness. The engine will have to be restarted to reset the Automatic Defensive Driving Illumination system 10.

Series II

The following steps are taken to begin operation and to adjust the Automatic Defensive Driving Illumination system 10. 1. Set the hour and minute that dusk begins using the dusk set switch S3. 2. Set the current hour and minute and whether AM or PM. 3. Start the engine. If the light go on it should be dusk or sometime during the hours of darkness. 4. Turn the key off, the lights will go off, if they were on. 5.

Your Automatic Defensive Driving Illumination unit should now be activated. 6. While driving after dusk the Automatic Defensive Driving Illumination system 10 will automatically turn on the headlights if you don't. 7. If the battery is or goes dead, repeat steps 1 through 5 to reset.

Series III

The following steps are taken to begin operation and to adjust the Automatic Defensive Driving Illumination system 10. 1. Start the engine. The lights will come on after the delay period. 2. Turn the key off, the lights will go off, if they were on. 3. The Automatic Defensive Driving Illumination unit is now activated. 4. While driving normally the Automatic Defensive Driving Illumination will turn on the headlights automatically if you don't. 5. If Battery is dead, repeat steps 1. through 4 above.

This invention provides an improvement over any other known automatic illumination system known in the art. The system herein described have none of the drawbacks associated with the use of a photoelectric cell, provides a fail safe method of determining when the engine is actually running and provides for a reliable means of determining the hours of darkness. Several inputs to the automatic defensive driving illumination system all have to be present for the actual illumination of the lights to occur. With the automatic defensive driving illumination system of this invention, once installed, will in a fail safe method, illuminate the lights of the vehicle when appropriate.

Having described the invention in detail, those skilled in the art will appreciate that modifications may be made of the invention without departing from the spirit of the inventive concept herein described.

Therefore, it is not intended that the scope of the invention be limited to the specific and preferred embodiments illustrated and described. Rather, it is intended that the scope of the invention be determined by the appended claims and their equivalents.

What is claimed is:

1. An automatic defensive driving illumination system which automatically illuminates headlights, taillights, side markers and other lights of a vehicle normally activated with the headlight switch when the ignition switch is turned on and the engine is running which comprises:

an enable logic means receiving inputs from means to determine if said engine is running and means to determine whether a starter for said engine is engaged or not, said enable means generating a logic high or low output based upon said inputs;

a delay logic means receiving said logical high or low output from said enable logic means, said delay logic means generating a logical low or high output based upon said inputs after a predetermined time interval;

a timing means for determining the time of the day, said timing means having an alarm, said alarm being set to correspond to the beginning of dusk, said timing means generating a logical high or low output based upon time of day;

a time hold logic means receiving said logical high or low output from said timing means, said time hold logic means generating a logical high output signal for a predetermined time interval after receiving a logical high output from said timing means, said logical high output from said timing means being triggered by said alarm in said timing means;

a silicon controlled rectifier decoder means having a plurality of inputs for receiving said outputs from said enable logic means, said delay logic means, and said time hold logic means, said silicon controlled rectifier decoder generating a logical high output when all of said inputs are logical high;

a silicon controlled rectifier means activated by said output generated by said silicon controlled rectifier decoder means; and a relay, said relay being activated by said silicon controlled rectifier means to illuminate the headlights, taillights, side markers and other lights normally activated with the headlight switch on said vehicle.

2. The automatic defensive driving illumination system as set forth in claim 1 in which said engine running determining means monitored by said enable logic means comprises a logic low or high electrical connection from an oil pressure indicating means on said engine.

3. The automatic defensive driving illumination system as set forth in claim 1 in which said enable logic means and silicon controlled rectifier decoder means comprises digital integrated circuit chips having a plurality of NAND gates.

4. The automatic defensive driving illumination system as set forth in claim 1 in which said delayed logic means comprises a digital integrated circuit time delayed logic chip.

5. The automatic defensive driving illumination system as set forth in claim 1 in which said timing means comprises a digital clock chip.

6. A fail safe circuit which automatically illuminates headlights, taillights, side markers and other lights of a vehicle normally activated with the headlight switch which comprises:

an enable logic means receiving logical high or low inputs from an engine running sensing means, an ignition switch for said vehicle, and a starter engaged sensing means, said enable logic means generating a logical high or low output based upon said inputs;

a delay logic means activated by a logical high output from said enable logical means, said delay logical means generating a logical high after a predetermined time;

a decoder means having inputs to receive said outputs from said enable logic means and said delay logic means, said decoder means generating a logical high output when said inputs from both said enable logic means and said delay logic means are logical high; and an illumination means to illuminate said lights on said vehicle when said illumination means is activated by said logic high output from said decoder means.

7. The circuit as set forth in claim 6 further comprising a timing means for determining the time of the day, said timing means having an output corresponding to a set time, said output of said timing means being a third input received by said decoder means, a logical high output from said timing means also required at said decoder means for said decoded means to have a logical high output.

8. The circuit as set forth in claim 7 in which said timing means comprises:

a clock means comprising a digital integrated circuit clock chip for determining the time of the day, said clock means having an output; and a time hold logic means receiving said output from said clock means, said time hold logic generating an output corresponding to a set time, said output being received by an input to said decoder means.

9. The circuit as set forth in claim 8 further comprising a reset logic means, said reset logic means resetting said output of said timing means.

10. The circuit as set forth in claim 6 in which said enable logic means and decoder means comprises digital integrated circuit chip having a plurality of NAND gates generating outputs based upon inputs.

11. The circuit as set forth in claim 6 in which said delay logic means comprises a digital integrated circuit dual timing chip.

12. The circuit as set forth in claim 6 in which said illumination means comprises a relay, said relay being activated by said output from said decoder means, and said relay closing a current circuit to illuminate said lights.

13. The circuit as set forth in claim 6 in which said engine running sensing means comprises an electrical logic high or low signal generated by an oil pressure indicating means on said engine.

14. A fail safe method of automatically illuminating headlights, taillights, side markers and other lights of a vehicle normally activated with the headlight switch in which the steps comprise:

determining if an engine in a vehicle is running using an engine running determining means, said engine running determining means having an output;

determining when a starter for said engine is not engaged with a starter engaged determining means, said starter engaged determining means having an output;

determining when the ignition for said engine is on with an ignition on determining means, said ignition on determining means having an output;

generating a delayed signal with a delayed signal generator means when activated by outputs of said engine running determining means, said starter engaged determining means and ignition on determining means;

means for combining outputs with a combining output means of said delayed signal generator means, and said engine running determining means to provide an output signal when all inputs are present; and activating an illumination means by said output of said combining output means to illuminate said lights on said vehicle.

15. The method of automatically illuminating headlights, taillights, side markers and other lights of a vehicle normally activated with the headlight switch as set forth in claim 6 in which the steps further comprise:

determining the time of the day with a timing means, said timing means having an output corresponding to a set time; and combining said output of said timing means with said outputs of the delayed signal generator means and said engine running determining means at said output combining means.

16. The method of automatically illuminating headlights, taillights, side markers and other lights of a vehicle normally activated with the headlight switch as set forth in claim 6 in which the steps of determining if said engine is running, determining if said starter is engaged, generating a delayed signal and combining said outputs of said delayed signal generator means and engine running determining means comprises using digital integrated circuit chips.

* * * * *